（12） United States Patent
Xie et al.

(10) Patent No.: US 10,217,007 B2
(45) Date of Patent: Feb. 26, 2019

(54) DETECTING METHOD AND DEVICE OF OBSTACLES BASED ON DISPARITY MAP AND AUTOMOBILE DRIVING ASSISTANCE SYSTEM

(71) Applicant: Beijing Smarter Eye Technology Co. Ltd., Beijing (CN)

(72) Inventors: Qiwei Xie, Beijing (CN); An Jiang, Beijing (CN); Xi Chen, Beijing (CN); Feng Cui, Beijing (CN); Haitao Zhu, Beijing (CN); Ran Meng, Beijing (CN)

( * ) Notice: Subject to any disclaimer, the term of this patent is extended or adjusted under 35 U.S.C. 154(b) by 87 days.

(21) Appl. No.: 15/470,283

(22) Filed: Mar. 27, 2017

(65) Prior Publication Data

US 2018/0018528 A1 Jan. 18, 2018

(30) Foreign Application Priority Data

Jan. 28, 2016 (CN) .......................... 2016 1 0057038

(51) Int. Cl.
*G06K 9/00* (2006.01)
*G06K 9/03* (2006.01)
(Continued)

(52) U.S. Cl.
CPC ..... *G06K 9/00805* (2013.01); *G06K 9/00201* (2013.01); *G06K 9/03* (2013.01);
(Continued)

(58) Field of Classification Search
CPC .... G06K 9/00201; G06K 9/03; G06K 9/6256; G06K 9/00805; G06K 9/00798;
(Continued)

(56) References Cited

U.S. PATENT DOCUMENTS 7,889,887 B2 * 2/2011 Azuma ................ G06K 9/4633
382/104
8,509,523 B2 * 8/2013 Schamp .............. B60R 21/0134
382/156
(Continued)

OTHER PUBLICATIONS

"A Novel Lane Detection System With Efficient Ground Truth Generation"; Amol Borkar; IEEE Transactions on Intelligent Transportation Systems; vol. 13, Issue: 1, Mar. 2012 p. 365-374 (Year: 2012).*

(Continued)

*Primary Examiner* — Michael S Osinski

(57) ABSTRACT

The present disclosure provides a disparity map-based obstacle detection method, a disparity map-based obstacle detection device, and a vehicle assistant driving system. The method includes steps of: acquiring a disparity map and a V disparity map in accordance with an image including a road surface; simulating the road surface in accordance with the V disparity map; identifying a first obstacle in accordance with a simulation result; extracting an object whose disparity value is greater than a first threshold in accordance with the disparity map, and subjecting the object to morphological operation so as to identify a second obstacle; extracting an object whose disparity value is smaller than a second threshold in accordance with the disparity map, and subjecting the object to morphological operation so as to identify a third obstacle; and screening the first obstacle, the second obstacle and the third obstacle in accordance with a training model, so as to detect the obstacle, the training model being acquired through machine learning in accordance with correct obstacle information and erroneous obstacle information. According to the present disclosure, it is able to improve the robustness.

7 Claims, 2 Drawing Sheets

(51) Int. Cl.
*G06K 9/62* (2006.01)
*G08G 1/01* (2006.01)
*G08G 1/04* (2006.01)
*G08G 1/16* (2006.01)

(52) U.S. Cl.
CPC ......... *G06K 9/6256* (2013.01); *G08G 1/0133* (2013.01); *G08G 1/04* (2013.01); *G08G 1/16* (2013.01); *G08G 1/165* (2013.01); *G08G 1/166* (2013.01); *G06K 2209/21* (2013.01); *G06T 2207/30252* (2013.01); *G06T 2207/30261* (2013.01)

(58) Field of Classification Search
CPC ........... G06K 9/00208; G06K 9/00791; G06K 9/4642; G08G 1/0133; G08G 1/04; G08G 1/16; G08G 1/165–1/166; G06T 2207/10028; G06T 2207/10012; G06T 2207/30261; G06T 2207/30252; G06T 2207/30256; G06T 2207/20061; G06T 2207/20081; H04N 13/204; H04N 13/239; H04N 2013/0081
See application file for complete search history.

(56) References Cited

U.S. PATENT DOCUMENTS

| | | | | |
|---|---|---|---|---|
| 8,611,598 B2 * | 12/2013 | Yankun | ............. | G06K 9/00805 382/103 |
| 8,768,007 B2 * | 7/2014 | Schamp | ............. | G06K 9/00201 382/103 |
| 8,861,791 B2 * | 10/2014 | You | ................... | G06K 9/00208 382/104 |
| 8,923,605 B2 * | 12/2014 | You | ................... | G06K 9/00208 382/154 |
| 8,965,052 B2 * | 2/2015 | Guan | ................. | G06K 9/00791 348/169 |
| 9,189,690 B2 * | 11/2015 | Guan | ................. | G06K 9/00798 |
| 9,349,058 B2 * | 5/2016 | Schamp | ................ | B60K 31/00 |
| 9,361,696 B2 * | 6/2016 | Allezard | ................... | G06T 7/50 |
| 9,378,424 B2 * | 6/2016 | You | ................... | G06K 9/00208 |
| 9,552,642 B2 * | 1/2017 | Heu | ........................ | G06T 7/246 |
| 9,582,867 B2 * | 2/2017 | Suhr | ........................ | G06T 7/593 |
| 9,886,649 B2 * | 2/2018 | Kakegawa | ............. | G08G 1/165 |
| 9,898,668 B2 * | 2/2018 | Ren | .................. | G06K 9/00798 |
| 9,955,136 B2 * | 4/2018 | Kuranuki | .................. | G01S 5/16 |
| 2002/0134151 A1 * | 9/2002 | Naruoka | ................. | G01S 11/12 73/291 |
| 2004/0057599 A1 * | 3/2004 | Okada | ................. | G06K 9/00805 382/103 |
| 2004/0252863 A1 * | 12/2004 | Chang | .................. | G06K 9/3241 382/104 |
| 2005/0232491 A1 * | 10/2005 | Chang | .................. | G06K 9/00362 382/199 |
| 2006/0210116 A1 * | 9/2006 | Azuma | ................. | G06K 9/00798 382/104 |
| 2006/0227041 A1 * | 10/2006 | Okamoto | ............... | G01S 13/867 342/174 |
| 2008/0164985 A1 * | 7/2008 | Iketani | .................. | G01S 7/4802 340/435 |
| 2008/0281521 A1 * | 11/2008 | Shirato | ...................... | B60T 7/22 701/301 |
| 2010/0299109 A1 * | 11/2010 | Saito | ................... | B60W 40/072 703/1 |
| 2012/0027258 A1 * | 2/2012 | Uchida | ............. | G06K 9/00805 382/103 |
| 2012/0300078 A1 * | 11/2012 | Ogata | .................... | G08G 1/166 348/148 |
| 2013/0004079 A1 * | 1/2013 | Yamada | ............... | G06K 9/4642 382/190 |
| 2013/0027196 A1 * | 1/2013 | Yankun | ............... | G06K 9/00805 340/435 |
| 2013/0128001 A1 * | 5/2013 | You | .................... | G06K 9/00208 348/47 |
| 2013/0129150 A1 * | 5/2013 | Saito | ........................ | G06K 9/46 382/104 |
| 2013/0163821 A1 * | 6/2013 | You | .................... | G06K 9/00208 382/104 |
| 2013/0322692 A1 * | 12/2013 | Guan | ................. | G06K 9/00791 382/103 |
| 2013/0322763 A1 * | 12/2013 | Heu | ........................ | G06T 7/246 382/195 |
| 2014/0071240 A1 * | 3/2014 | Chen | ........................ | G06T 7/70 348/46 |
| 2014/0086477 A1 * | 3/2014 | You | ........................ | B60W 40/06 382/154 |
| 2014/0133699 A1 * | 5/2014 | Guan | .................. | G06K 9/00798 382/103 |
| 2014/0236473 A1 * | 8/2014 | Kondo | ............... | G01C 21/3647 701/400 |
| 2015/0036887 A1 * | 2/2015 | Allezard | .................... | G06T 7/50 382/106 |
| 2015/0294161 A1 * | 10/2015 | Schamp | .................. | B60K 31/00 701/37 |
| 2015/0358610 A1 * | 12/2015 | Takahashi | ................ | G06T 7/593 348/47 |
| 2016/0014394 A1 * | 1/2016 | Suhr | ........................ | G06T 7/593 348/43 |
| 2016/0217335 A1 * | 7/2016 | Levi | ..................... | G06K 9/00805 |
| 2016/0253575 A1 * | 9/2016 | Kakegawa | ............. | G08G 1/165 701/70 |
| 2016/0305785 A1 * | 10/2016 | Nishijima | ........... | G06K 9/00798 |
| 2016/0307051 A1 * | 10/2016 | Nishijima | ........... | G06K 9/00805 |
| 2016/0307052 A1 * | 10/2016 | Han | ..................... | G06K 9/00798 |
| 2017/0124725 A1 * | 5/2017 | Sumiyoshi | ............ | H04N 13/239 |
| 2017/0161569 A1 * | 6/2017 | Ren | ...................... | G06K 9/00798 |
| 2017/0262734 A1 * | 9/2017 | Nakata | ..................... | G08G 1/166 |
| 2018/0204345 A1 * | 7/2018 | Motohashi | ............... | G08G 1/16 |
| 2018/0253868 A1 * | 9/2018 | Bratt | ...................... | G06T 11/001 |
| 2018/0264736 A1 * | 9/2018 | Lefebvre | ................ | B33Y 50/02 |
| 2018/0268229 A1 * | 9/2018 | Nakata | .................... | G06T 7/593 |
| 2018/0268598 A1 * | 9/2018 | Lefebvre | ............... | G06F 17/50 |
| 2018/0300562 A1 * | 10/2018 | Yamada | .................... | G06T 1/00 |
| 2018/0322648 A1 * | 11/2018 | Lu | ........................... | G06T 7/593 |

OTHER PUBLICATIONS

"Obstacle Detection in Stereo Sequences using Multiple Representations of the Disparity Map"; Adrian Burlacu; 2016 20th International Conference on System Theory, Control and Computing (Year: 2016).*

"Accurate vertical road profile estimation using v-disparity map and dynamic programming"; Ji-Yeol Park; 2017 IEEE 20th International Conference on Intelligent Transportation Systems (Year: 2017).*

"Dense disparity map-based pedestrian detection for intelligent vehicle"; Chung-Hee Lee; 2016 IEEE International Conference on Intelligent Transportation Engineering (Year: 2016).*

"Obstacle Detection Using Unsynchronized Multi-Camera Network"; Rawia Mhiri; The 12th International Conference on Ubiquitous Robots and Ambient Intelligence Oct. 2015 (Year: 2015).*

\* cited by examiner

DETECTING METHOD AND DEVICE OF OBSTACLES BASED ON DISPARITY MAP AND AUTOMOBILE DRIVING ASSISTANCE SYSTEM

CROSS REFERENCE TO RELATED APPLICATIONS

This application is related to and claims the benefit of Chinese Patent Application Number 201610057038.1, filed on Jan. 28, 2016, the contents of which are herein incorporated by reference in their entirety.

TECHNICAL FIELD

The present disclosure relates to the field of digital image processing technology, in particular to a disparity map-based obstacle detection method, a disparity map-based obstacle detection device, and a vehicle assistant driving system.

BACKGROUND

Along with the development of sensor technologies and binocular vision technologies, more and more disparity algorithms have emerged in the field of robots and smart vehicles, so as to analyze a disparity image to acquire obstacle information. A vehicle assistant driving technology has been presented so as to provide necessary information and/or warning to a user who is driving a vehicle, thereby to prevent the occurrence of such dangerous situations as collision and departure from a road. In some cases, the vehicle assistant driving technology may also be used to control the vehicle automatically.

Hence, there is an urgent need to provide a scheme to correctly detect an obstacle on the road.

SUMMARY

A main object of the present disclosure is to provide a disparity map-based obstacle detection method, a disparity map-based obstacle detection device, and a vehicle assistant driving system, so as to at least partially solve the technical problem about how to improve robustness.

In one aspect, the present disclosure provides in some embodiments a disparity map-based obstacle detection method, at least including steps of: acquiring a disparity map and a V disparity map in accordance with an image including a road surface; simulating the road surface in accordance with the V disparity map; identifying a first obstacle in accordance with a simulation result; extracting an object whose disparity value is greater than a first threshold in accordance with the disparity map, and subjecting the object to morphological operation so as to identify a second obstacle; extracting an object whose disparity value is smaller than a second threshold in accordance with the disparity map, and subjecting the object to morphological operation so as to identify a third obstacle; and screening the first obstacle, the second obstacle and the third obstacle in accordance with a training model, so as to detect the obstacle, the training model being acquired through machine learning in accordance with correct obstacle information and erroneous obstacle information.

In another aspect, the present disclosure provides in some embodiments a disparity map-based obstacle detection device, at least including: an acquisition unit configured to acquire a disparity map and a V disparity map in accordance with an image including a road surface; a simulation unit configured to simulate the road surface in accordance with the V disparity map; a first identification unit configured to identify a first obstacle in accordance with a simulation result; a second identification unit configured to extract an object whose disparity value is greater than a first threshold in accordance with the disparity map, and subject the object to morphological operation so as to identify a second obstacle; a third identification unit configured to extract an object whose disparity value is smaller than a second threshold in accordance with the disparity map, and subject the object to morphological operation so as to identify a third obstacle; and a detection unit configured to screen the first obstacle, the second obstacle and the third obstacle in accordance with a training model, so as to detect the obstacle, the training model being acquired through machine learning in accordance with correct obstacle information and erroneous obstacle information.

In yet another aspect, the present disclosure provides in some embodiments a vehicle assistant driving system including the above-mentioned disparity map-based obstacle detection device.

As compared with the related art, the above technical solutions at least have the following beneficial effects.

According to the embodiments of the present disclosure, the disparity map and the V disparity map may be acquired in accordance with the image including the road surface. The road surface may be simulated in accordance with the V disparity map, and the first obstacle may be identifier in accordance with a simulation result. The object whose disparity value is greater than the first threshold may be extracted in accordance with the disparity map, and then subjected to the morphological operation so as to identify the second obstacle. The object whose disparity value is smaller than the second threshold may be extracted in accordance with the disparity map, and then subjected to the morphological operation so as to identify the third obstacle. Then, the first obstacle, the second obstacle and the third obstacle may be screened in accordance with the training model, so as to detect the obstacle. As a result, by taking various actual driving scenarios into consideration, it is able to improve the robustness of a result of the obstacle detection.

It should be appreciated that, the products in the embodiments of the present disclosure are unnecessarily to have all the above-mentioned beneficial effects at the same time.

The other features and advantages of the present disclosure will be described in the following, and they will partially become more apparent from the description or they will be understood through the implementation of the present disclosure. The objects and the other advantages of the present disclosure may be realized and acquired through methods specified in the description, the drawings and the appended claims.

BRIEF DESCRIPTION OF THE DRAWINGS

The following drawings are provided to facilitate the understanding of the present disclosure, and constitute a portion of the description. These drawings and the following embodiments are for illustrative purposes only, but shall not be construed as limiting the present disclosure. Obviously, the following drawings merely relate to some embodiments of the present disclosure, and based on these drawings, a person skilled in the art may obtain the other drawings without any creative effort. In these drawings.

Figure 1:
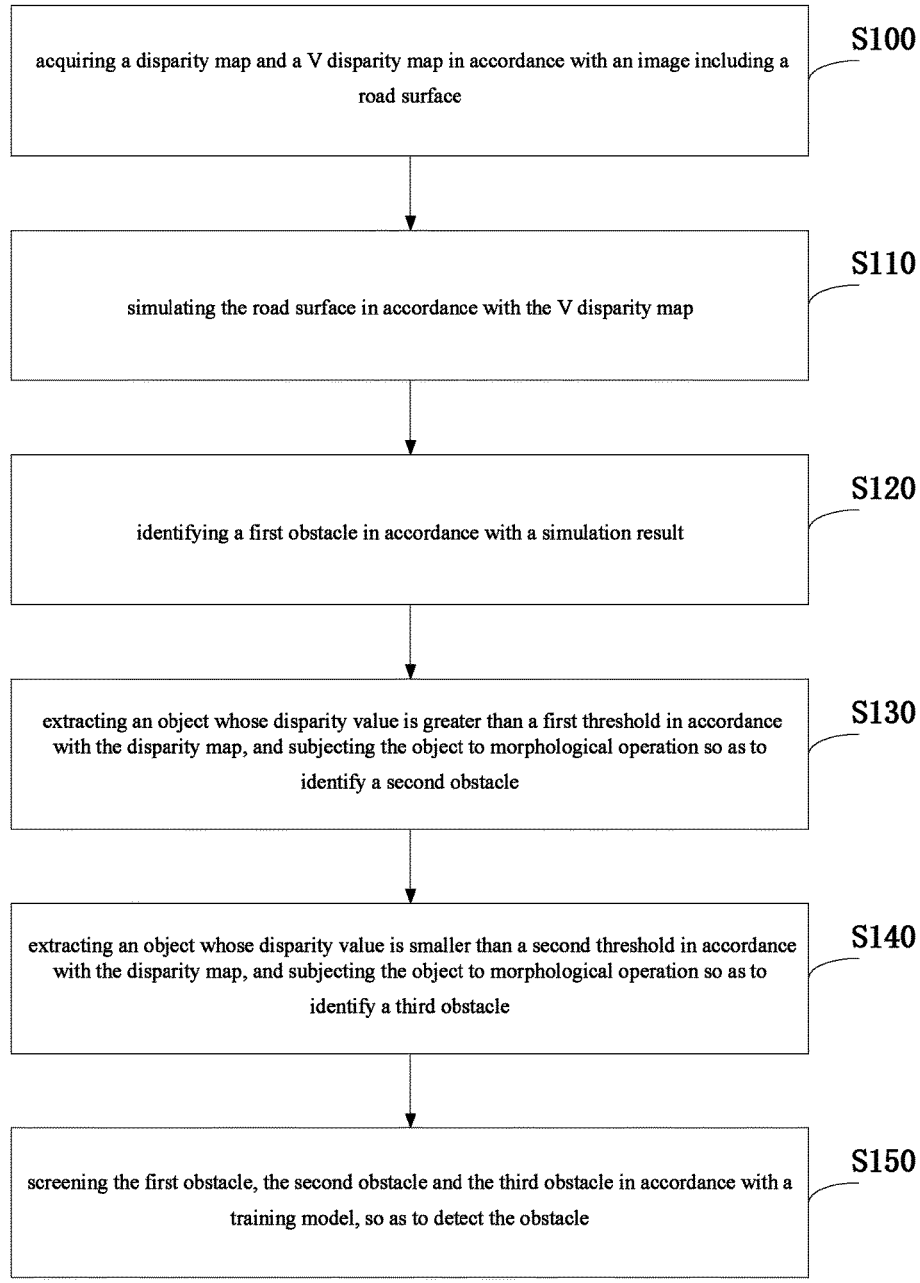
FIG. 1 is a flow chart of a disparity map-based obstacle detection method according to one embodiment of the present disclosure.

These drawings and the descriptions thereof are not intended to limit a scope of the present disclosure in any way, and instead, a concept of the present disclosure may be apparent with reference to specific embodiments.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other equivalent or modified embodiments, which also fall within the scope of the present disclosure. These embodiments may be achieved in accordance with various ways defined and included in the appended claims.

It should be appreciated that, in the following description, many details are given so as to facilitate the understanding of the present disclosure. Obviously, the implementation of the present disclosure may be achieved without these details.

It should be further appreciated that, the embodiments and the technical features therein may be combined with each other to form technical solutions, in the case of no specific definition or no conflict.

Some basic concepts involved in the embodiments of the present disclosure will be described briefly hereinafter.

Disparity refers to the apparent displacement of an object as seen from two different points that are not on a line with the object In the case that left-eye and right-eye images of an identical object are taken by such an imaging device as binocular camera, the disparity of this object may be understood as a difference between a horizontal-axis coordinate value of the object in the left-eye image and a horizontal-axis coordinate value of the object in the right-eye image.

Disparity map refers to an image which is acquired by taking any image as a reference image and taking a size of the reference image as a size of the image, and in which each pixel corresponds to a point having identical coordinate values to the pixel in the reference image and a grayscale value of each pixel is equal to a disparity value of the corresponding point in the reference image. The disparity map may be acquired in various known ways. For example, it may be acquired in accordance with the left-eye image and the right-eye image taken by the binocular camera, or in accordance with images taken by a multi-view camera or stereo camera, or in accordance with a depth map in a stereo view.

Coordinate values of each point in the reference image may be represented as (x, y), where x represents a horizontal-axis coordinate value, and y represents a longitudinal-axis coordinate value. The smaller the value of y, the smaller the distance between the point and the camera. In a two-dimensional disparity map acquired from the reference image through conversion, coordinate values of a point corresponding to the point (x, y) may be represented as (u, v), where u represents an horizontal-axis coordinate value, v represents a longitudinal-axis coordinate value, u=x, and v=y. In addition, each point in the disparity map has a grayscale value equal to a disparity value at the point, represented by d. In a possible embodiment of the present disclosure, each point in the disparity map may be represented as (u, v, d), so as to reflect the coordinates value of the point and the disparity value at the point simultaneously.

Both a V disparity map and a U disparity map may be derived from the disparity map. The V disparity map may be considered as a side view of a three-dimensional scenario, with a d-axis as its horizontal axis and a v-axis as its longitudinal axis. Each point in the V disparity map may be represented as (d, v), and a grayscale value (brightness value) of the point (d, v) is the number of the points in the corresponding disparity map which have a longitudinal-axis coordinate value of v and at which the disparity value is d. Hence, it is able to derive the V disparity map from the disparity map by counting the number of these points or using any other known methods in the art.

The present disclosure provides in some embodiments a disparity map-based obstacle detection method which, as shown in FIG. 1, at least includes the following steps.

Step S100: acquiring a disparity map and a V disparity map in accordance with an image including a road surface.

This step may be performed by any methods of acquiring the disparity map that are already known in the art or that may occur in the future. For example, images may be taken by a binocular camera, a multi-view camera or a stereo camera and then the disparity map may be acquired through calculation. To be specific, the binocular camera may be installed on a vehicle, and in the case that the vehicle is running on a rod, a left-eye image and a right-eye image (grayscale images) including the road surface in front of the vehicle may be taken by the binocular camera. Then, any of the left-eye image and the right-eye image may be selected as a reference image, and the disparity map may be derived from the left-eye image and the right-eye image. In a possible embodiment of the present disclosure, a depth map may be acquired from a stereo view, and then the disparity map may be acquired in accordance with the depth map.

The V disparity map may be derived from the disparity map, which will not be particularly defined herein.

Step S110: simulating the road surface in accordance with the V disparity map.

In this step, the simulation may be completed by a Digital Signal Processor (DSP) image processing module in a vehicle assistant driving system, and a simulation method may include, but not limited to, Hough transformation.

As is known in the art, there are various methods for detecting a straight line from an image. The following description will be given by taking Hough transformation as an example.

Hough transformation is a conventional method for detecting a straight line from an image. Through Hough transformation, a linear equation y=kx+b in a rectangular plane coordinate system may be represented as r=x·cos θ+y·sin θ, where R represents a distance between the straight line and an origin, and θ represents an angle of the straight line relative to an x-axis. For any point (x0, y0), all the straight lines passing through this point shall satisfy the equation r(θ)=x0·cos θ+y0·sin θ. In the case of detecting the straight line through Hough transformation, with respect to each point in the image, a set of straight lines passing through the point and represented in the form of (r, θ) may be determined (i.e., values of r may be calculated with respect to θ sampled within the range of 0° to 360° at a certain interval), and coordinate values of the set of the straight lines passing through each point may constitute a curve in a Hough space. An intersection of a plurality of curves in the Hough space represents a straight line formed by the corresponding points. Usually, the detected straight line is represented by the intersection formed by most curves.

Through the simulation, an oblique line may be formed in the V disparity map, and it represents a projection of a ground surface.

Step S120: identifying a first obstacle in accordance with a simulation result.

In this step, the first obstacle may be identified by a built-in DSP in the vehicle assistant driving system. In the V disparity map, the oblique line representing the projection of the ground surface may cross a projection of an object at a certain intersection. In the case that the road surface is taken as a reference, the obstacle may be located on the road surface. Hence, the object at the intersection may be determined as a possible obstacle.

Step S130: extracting an object whose disparity value is greater than a first threshold in accordance with the disparity map, and subjecting the object to morphological operation so as to identify a second obstacle.

This step may be performed by the built-in DSP in the vehicle assistant driving system. In this step, the objects in the disparity map may be classified in accordance with their disparity values, and then the morphological operation may be performed, so as to identify any possible obstacles near the vehicle. For example, in an actual driving scenario, such an obstacle as cart may be located in front of the vehicle, and at this time, it is necessary to identify this kind of obstacle.

The greater the disparity value, the smaller the distance between the object and the camera. Through morphological transformation, it is able to remove a portion of the object connected to the road surface, thereby to identify any possible obstacle near the vehicle.

The first threshold may be set in accordance with the practical need.

Step S140: extracting an object whose disparity value is smaller than a second threshold in accordance with the disparity map, and subjecting the object to morphological operation so as to identify a third obstacle.

This step may be performed by the built-in DSP in the vehicle assistant driving system. In this step, the objects in the disparity map may be classified in accordance with their disparity values, and then the morphological operation may be performed, so as to identify any possible obstacles far away from the vehicle.

The smaller the disparity value, the greater the distance between the object and the camera. Through morphological transformation, it is able to remove a portion of the object connected to the road surface, thereby to identify any possible obstacle far away from the vehicle.

The second threshold may be set in accordance with the practical need.

For example, in the actual driving scenario, in the case that a vehicle far away from the current vehicle has a disparity value of 3, the road surface may also include a region having a disparity value of 3, so the road surface may possibly be connected to the vehicle. However, the road surface is of a narrow-belt form. At this time, through the morphological operation, it is able to remove the portion of the vehicle connected to the road surface, thereby to acquire a region where the vehicle is located.

Step S150: screening the first obstacle, the second obstacle and the third obstacle in accordance with a training model, so as to detect the obstacle, the training model being acquired through machine learning in accordance with correct obstacle information and erroneous obstacle information.

This step may be performed by the built-in DSP in the vehicle assistant driving system. Through screening the first obstacle, the second obstacle and the third obstacle, it is able to detect and determine the final obstacle.

In this step, the training model may be acquired through the following steps.

Step S151: acquiring the disparity map and the V disparity map in accordance with the image including the road surface.

Step S152: simulating the road surface in accordance with the V disparity map.

Step S153: identifying the first obstacle in accordance with the simulation result.

Step S154: extracting the object whose disparity value is greater than the first threshold in accordance with the disparity map, and subjecting the object to the morphological operation so as to identify the second obstacle.

Step S155: extracting the object whose disparity value is smaller than the second threshold in accordance with the disparity map, and subjecting the object to the morphological operation so as to identify the third obstacle.

Step S156: manually screening the first obstacle, the second obstacle and the third obstacle.

Step S157: marking the correct obstacle information and the erroneous obstacle information in accordance with a screening result, so as to form a training set. This step may be performed by the built-in DSP in the vehicle assistant driving system. For example, in the case of an erroneous disparity value due to a lane marking on the road surface, and a characteristic of a similar line may be extracted at a position where the erroneous disparity value occurs and a mark "−1" may be provided. Identically, at a correct position, a characteristic of a similar line may be extracted and a mark "+1" may be provided.

Step S158: performing machine learning in accordance with the training set as well as obstacle region information and an image characteristic in the disparity map, so as to generate the training model.

In a possible embodiment of the present disclosure, the image characteristic may at least include a grayscale value.

In a possible embodiment of the present disclosure, the training model may be a classification regression decision tree model.

It should be appreciated that, some steps for acquiring the training model may be identical to those in the method for detecting the obstacle, and thus they will not be particularly defined herein. During the actual application, the road surface or the lane marking may possibly be considered as the obstacle, and at this time, it is necessary to judge the possible obstacle, so as to prevent the occurrence of false detection.

In some embodiments of the present disclosure, prior to the step of manually screening the obstacles, the method for acquiring the training model may further include calculating gradient information of the disparity map, and removing the obstacle having a small gradient modulus value in accordance with the gradient information and disparity information.

The so-called "gradient" refers to a gradient of a function, i.e., a difference in x and y directions. For each point in the disparity map, its difference in the x and y directions may be calculated, and then a modulus value, i.e., the gradient modulus value, may be calculated. Then, the obstacle having a small gradient modulus value may be removed. During the judgment using the training model, a region with a mark "−1" may be considered as an erroneously detected region.

Although the above-mentioned steps have been described in order, it should be appreciated that, in order to achieve the mentioned effects, these steps may be performed simultaneously or in different orders, which also falls within the scope of the present disclosure.

Figure 2:
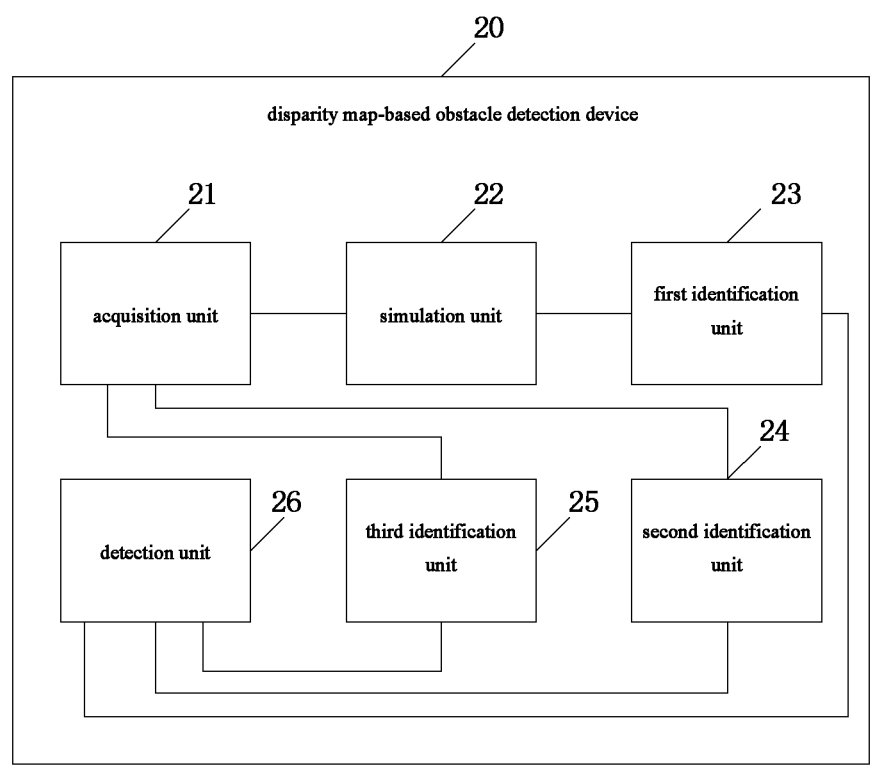
FIG. 2 is a schematic view showing a disparity map-based obstacle detection device according to one embodiment of the present disclosure.

Based on an identical inventive concept, the present disclosure further provides in some embodiments a disparity map-based obstacle detection device 20 built in a vehicle assistant driving system. As shown in FIG. 2, the disparity map-based obstacle detection device 20 at least includes an acquisition unit 21, a simulation unit 22, a first identification unit 23, a second identification unit 24, a third identification unit 25, and a detection unit 26. The acquisition unit 21 is configured to acquire a disparity map and a V disparity map in accordance with an image including a road surface. The simulation unit 22 is configured to simulate the road surface in accordance with the V disparity map. The first identification unit 23 is configured to identify a first obstacle in accordance with a simulation result. The second identification unit 24 is configured to extract an object whose disparity value is greater than a first threshold in accordance with the disparity map, and subject the object to morphological operation so as to identify a second obstacle. The third identification unit 25 is configured to extract an object whose disparity value is smaller than a second threshold in accordance with the disparity map, and subject the object to morphological operation so as to identify a third obstacle. The detection unit 26 is configured to screen the first obstacle, the second obstacle and the third obstacle in accordance with a training model, so as to detect the obstacle. The training model is acquired through machine learning in accordance with correct obstacle information and erroneous obstacle information.

In some possible embodiments of the present disclosure, the detection unit may include an acquisition module, a simulation module, a first identification module, a second identification module, a third identification module, a screening module, a marking module and a generation module. The acquisition module is configured to acquire the disparity map and the V disparity map in accordance with the image including the road surface. The simulation module is configured to simulate the road surface in accordance with the V disparity map. The first identification module is configured to identify the first obstacle in accordance with the simulation result. The second identification module is configured to extract the object whose disparity value is greater than the first threshold in accordance with the disparity map, and subject the object to the morphological operation so as to identify the second obstacle. The third identification module is configured to extract the object whose disparity value is smaller than the second threshold in accordance with the disparity map, and subject the object to the morphological operation so as to identify the third obstacle. The screening module is configured to manually screen the first obstacle, the second obstacle and the third obstacle. The marking module is configured to mark the correct obstacle information and the erroneous obstacle information in accordance with a screening result, so as to form a training set. The generation module is configured to perform machine learning in accordance with the training set as well as obstacle region information and an image characteristic in the disparity map, so as to generate the training model.

In some possible embodiments of the present disclosure, the detection unit may further include a calculation module and a removal module. The calculation module is configured to calculate gradient information of the disparity map. The removal module is configured to remove the obstacle having a small gradient modulus value in accordance with the gradient information and disparity information.

The present disclosure further provides in some embodiments a vehicle assistant driving system including the above-mentioned disparity map-based obstacle detection device.

In the embodiments of the present disclosure, the terms "x direction" and "y direction" are used to indicate directions in specific drawings, but it should be appreciated that, these terms shall not be used to indicate absolute directions. In other words, "x direction" may refer to any direction, and "y direction" may refer to a specific direction different from the x direction. Usually, "x direction" is perpendicular to "y direction".

It should be appreciated that, the present disclosure has been described hereinbefore by taking a vehicle assistant driving scenario as an example. However, the present disclosure may also be applied to such fields as vehicle detection, tracking, and driving warning.

It should be further appreciated that, in the case of detecting the obstacle, the disparity map-based obstacle detection device has been illustrated hereinabove merely on the basis of the above functional modules. During the actual application, the above-mentioned functions may be achieved by different functional modules according to the practical need, i.e., the disparity map-based obstacle detection device may include different functional modules, so as to achieve all of or parts of the above-mentioned functions.

The above-mentioned device may be used to implement the above-mentioned method, with similar technical principles, similar technical problems to be solved and similar technical effects to be generated. It should be appreciated that, for ease of description, an operating procedure of the device may refer to that mentioned in the embodiments about the method, and thus will not be particularly defined herein.

It should be appreciated that, although the device and the method in the embodiments of the present disclosure have been separately described hereinbefore, details in the embodiments about the device may also be applied to the embodiments about the method. Names of the modules or steps involved in the embodiments of the present disclosure are merely provided to differentiate the modules or steps, but shall not be construed as limiting the scope of the present disclosure. It should be further appreciated that, the modules or steps involved in the embodiments of the present disclosure may be further divided or combined. For example, the above-mentioned modules may be combined into one module, or further divided into more sub-modules.

The technical solutions in the embodiments of the present disclosure have been described in details. Although the principles and implementations have been described with reference to specific embodiments, these embodiments are merely provided to facilitate the understanding of the present disclosure. It should be appreciated that, based on these embodiments, any modification may be made without departing from the scope of the present disclosure.

It should be further appreciated that, the flow charts or block diagrams involved in the embodiments of the present disclosure are not limited to the forms mentioned above, and they may be divided or combined in any possible manner.

It should be further appreciated that, signs and words in the drawings are merely used to facilitate the understanding of the present disclosure, but shall not be construed as limiting the scope of the present disclosure.

Such terms as "include" or "including" or any other variations involved in the present disclosure intend to provide non-exclusive coverage, so that a procedure, method, article or device including a series of elements may also include any other elements not listed herein, or may include any inherent elements of the procedure, method, article or device.

The modules in the embodiments of the present disclosure may be implemented by a general-purpose computing device. For example, they may be integrated into a single computing device, e.g., a person computer, a server computer, a handheld device or a portable device, a flat-panel device or a multiprocessor device, or distributed on a network consisting of a plurality of computing device. They may be used to perform the steps in an order different from that mentioned above. In addition, they may also be manufactured into integrated circuit modules, or parts of them maybe manufactured into a single integrated circuit module. Hence, the present disclosure is not limited to any specific hardware or software or a combination thereof.

The method in the embodiments of the present disclosure may be achieved by a programmable logic device, or implemented as computer program software or a program module (including a routine, a program, an object, or a component or data structure capable of executing a specific task or achieving a specific abstract data type). For example, the product in the embodiments of the present disclosure may be a computer program product, which may be executed so as to enable a computer to achieve the steps of the method. The computer program product includes a computer-readable storage medium where a computer program logic or code is stored so as to execute the steps of the method. The computer-readable storage medium may be a medium built in the computer or a medium detachable from the computer (e.g., a hot-swappable storage device). The built-in medium may include, but not limited to, a rewritable nonvolatile memory, e.g., Random Access Memory (RAM), Read Only Memory (ROM), flash memory and hard disk. The detachable medium may include, but not limited to, an optical storage medium (e.g., Compact Disk-Read Only Memory (CD-ROM) and Digital Video Disk (DVD)), a magneto-optical (MO) storage medium, a magnetic storage medium (e.g., magnetic tape or mobile hard disk), a medium having a built-in, rewritable, nonvolatile memory (e.g., a storage card), and a medium having a built-in ROM (e.g., a ROM box).

Although with the above-mentioned descriptions, it should be appreciated that, a person skilled in the art may make various modifications, substitutions or improvements without departing from the spirit of the present disclosure, and these modifications, substitutions or improvements shall also fall within the scope of the present disclosure.

The invention claimed is:

1. A disparity map-based obstacle detection method, at least comprising the steps of:
   acquiring a disparity map and a V-disparity map in accordance with an image comprising a road surface;
   simulating the road surface in accordance with the V-disparity map;
   identifying a first obstacle in accordance with a result of simulating the road surface;
   extracting an object whose disparity value is greater than a first threshold in accordance with the disparity map, and subjecting the extracted object whose disparity value is greater than the first threshold to a morphological operation so as to identify a second obstacle;
   extracting an object whose disparity value is smaller than a second threshold in accordance with the disparity map, and subjecting the extracted object whose disparity value is smaller than the second threshold to a morphological operation so as to identify a third obstacle; and
   screening the first obstacle, the second obstacle and the third obstacle in accordance with a training model, so as to detect a final obstacle, the training model being acquired through machine learning in accordance with correct obstacle information and erroneous obstacle information.

2. The disparity map-based obstacle detection method according to claim 1, wherein the training model is acquired by the steps of:
   acquiring the disparity map and the V-disparity map in accordance with the image comprising the road surface;
   simulating the road surface in accordance with the V-disparity map;
   identifying the first obstacle in accordance with the result of simulating the road surface;
   extracting the object whose disparity value is greater than the first threshold in accordance with the disparity map, and subjecting the extracted object whose disparity value is greater than the first threshold to a the morphological operation so as to identify the second obstacle;
   extracting the object whose disparity value is smaller than the second threshold in accordance with the disparity map, and subjecting the extracted object whose disparity value is smaller than the second threshold to a the morphological operation so as to identify the third obstacle;
   manually screening the first obstacle, the second obstacle and the third obstacle;
   marking the correct obstacle information and the erroneous obstacle information in accordance with a screening result, so as to form a training set; and
   performing machine learning in accordance with the training set as well as obstacle region information and an image characteristic in the disparity map, so as to generate the training model.

3. The disparity map-based obstacle detection method according to claim 2, wherein prior to manually screening the first obstacle, the second obstacle, and the third obstacle, gradient information of the disparity map is calculated, and an obstacle having a small gradient modulus value is removed in accordance with the gradient information and disparity information.

4. A disparity map-based obstacle detection device, at least comprising:
   an acquisition unit configured to acquire a disparity map and a V-disparity map in accordance with an image including a road surface;
   a simulation unit configured to simulate the road surface in accordance with the V-disparity map;
   a first identification unit configured to identify a first obstacle in accordance with a result of simulating the road surface;
   a second identification unit configured to extract an object whose disparity value is greater than a first threshold in accordance with the disparity map, and subject the extracted object whose disparity value is greater than the first threshold to a morphological operation so as to identify a second obstacle;

a third identification unit configured to extract an object whose disparity value is smaller than a second threshold in accordance with the disparity map, and subject with the extracted object whose disparity value is smaller than the second threshold to a morphological operation so as to identify a third obstacle; and a detection unit configured to screen the first obstacle, the second obstacle and the third obstacle in accordance with a training model, so as to detect a final obstacle, the training model being acquired through machine learning in accordance with correct obstacle information and erroneous obstacle information.

5. The disparity map-based obstacle detection device according to claim 4, wherein the detection unit comprises:

an acquisition module configured to acquire the disparity map and the V-disparity map in accordance with the image including the road surface;

a simulation module configured to simulate the road surface in accordance with the V-disparity map;

a first identification module configured to identify the first obstacle in accordance with the result of simulating the road surface;

a second identification module configured to extract the object whose disparity value is greater than the first threshold in accordance with the disparity map, and subject the extracted object whose disparity value is greater than the first threshold to a the morphological operation so as to identify the second obstacle;

a third identification module configured to extract the object whose disparity value is smaller than the second threshold in accordance with the disparity map, and subject the extracted object whose disparity value is smaller than the second threshold to a the morphological operation so as to identify the third obstacle;

a screening module configured to manually screen the first obstacle, the second obstacle and the third obstacle;

a marking module configured to mark the correct obstacle information and the erroneous obstacle information in accordance with a screening result, so as to form a training set; and a generation module configured to perform machine learning in accordance with the training set as well as obstacle region information and an image characteristic in the disparity map, so as to generate the training model.

6. The disparity map-based obstacle detection device according to claim 5, wherein the detection unit further comprises:

a calculation module configured to calculate gradient information of the disparity map; and a removal module configured to remove an obstacle having a small gradient modulus value in accordance with the gradient information and disparity information.

7. A vehicle assistant driving system, comprising the disparity map-based obstacle detection device according to any one of claims 4 to 6.

* * * * *